A. T. KEITH.
TACK PLATE FEEDER.
APPLICATION FILED JUNE 14, 1913.
1,098,906.
Patented June 2, 1914.
2 SHEETS—SHEET 1.
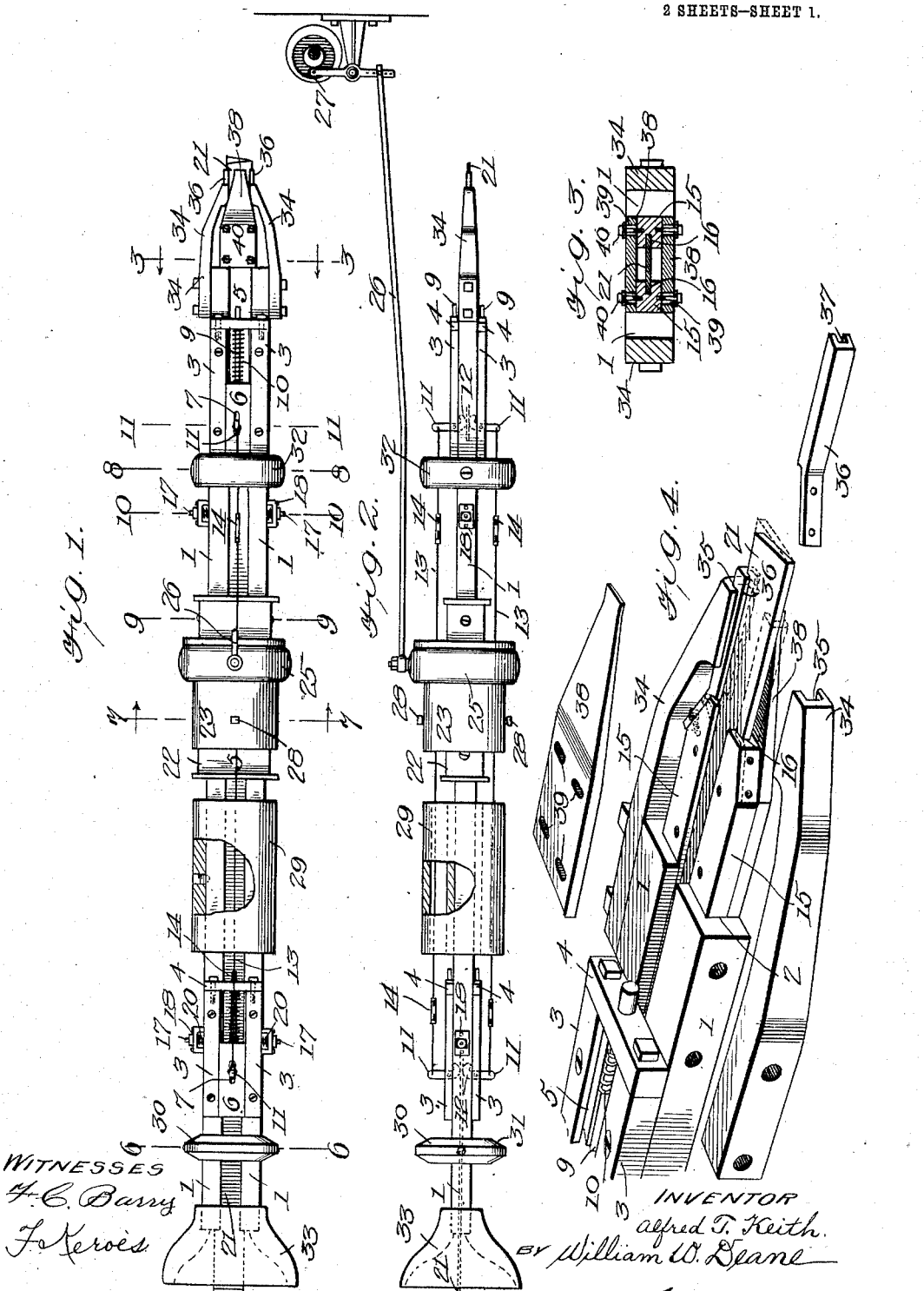
WITNESSES
F. C. Barry
J. Keroès
INVENTOR
Alfred T. Keith.
BY William W. Deane
ATTORNEY

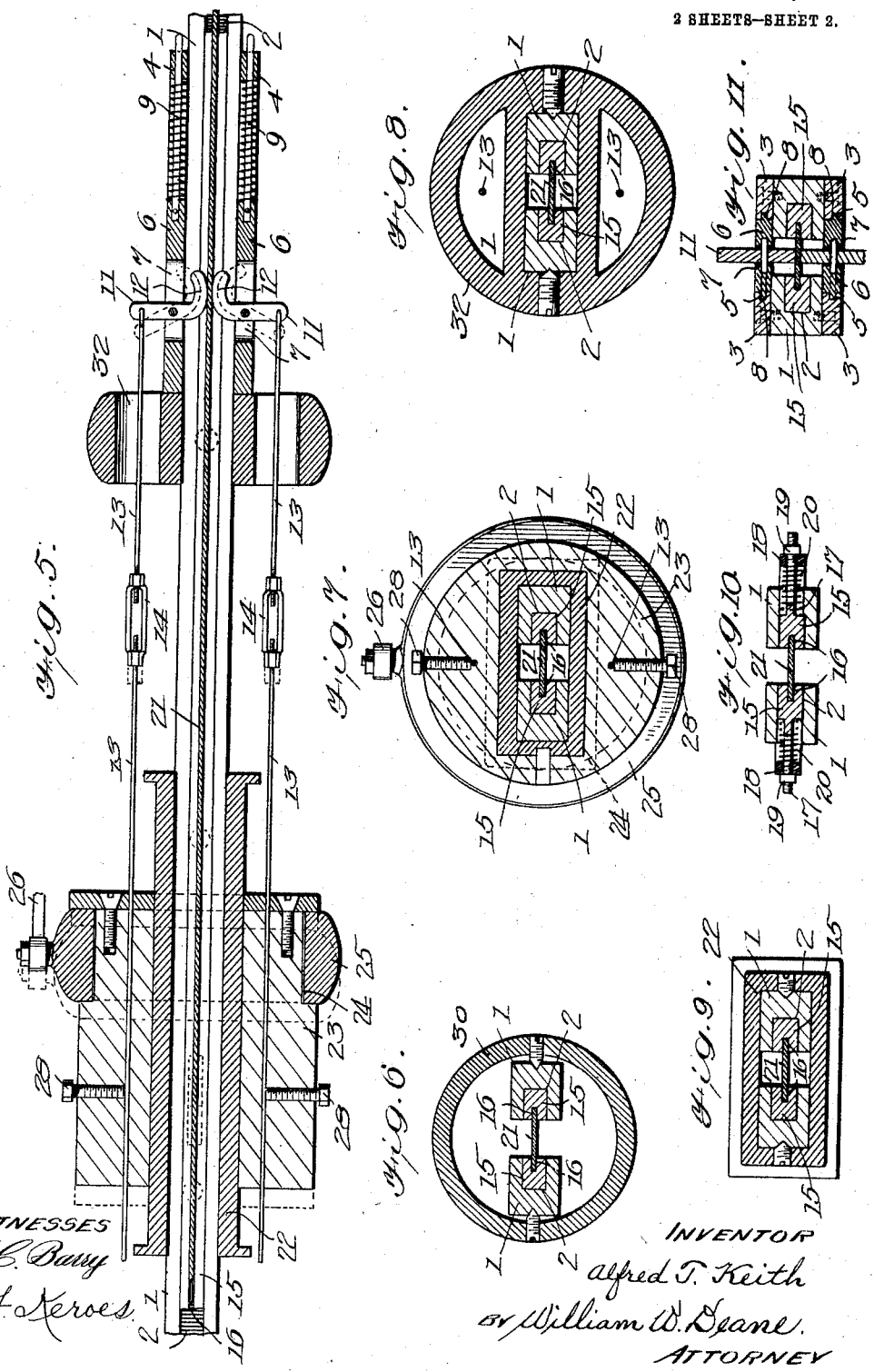

UNITED STATES PATENT OFFICE.

ALFRED T. KEITH, OF BRIDGEWATER, MASSACHUSETTS.

TACK-PLATE FEEDER.

1,098,906.  Specification of Letters Patent.  Patented June 2, 1914.

Application filed June 14, 1913. Serial No. 773,632.

*To all whom it may concern:*

Be it known that I, ALFRED T. KEITH, a citizen of the United States, residing at Bridgewater, in the county of Plymouth and State of Massachusetts, have invented certain new and useful Improvements in Tack-Plate Feeders, of which the following is a specification.

This invention relates to tack plate feeders, and it consists of the novel features hereinafter described and claimed.

An object of the invention is to improve the structure of tack plate feeders especially adapted to be used in conjunction with cutters for forming blanks from which tacks or nails are made.

With this object in view the feeder comprises parallel channeled bars held in spaced relation with spring pressed members located in the channels of the said bars. The said members are provided at their inner side with grooves which slidably receive the plate. Means is provided for advancing the plate at intervals between the said members so that an end portion of the plate will be projected beyond the end of the feeder. During the retractive movement of the said advancing means, the members above stated grip the edge portion of the plate and hold the same against rearward movement as the advancing means are retracted.

A further object of the invention is to provide in combination with a feeder as indicated, a nosepiece or mechanism of especial design and arrangement adapted to accurately direct the end portion of the plate toward the knives which cut the blank and adapted to hold the butt end portion of a plate, during the cutting operation. Heretofore feeders of this character have been constructed of general cylindrical configuration whereas the present feeder is approximately rectangular in transverse section and consequently the parts are compactly assembled and occupy but little space. Furthermore, the parts are so arranged as to effectually brace each other whereby an extremely strong structure of a simple nature is effected.

With these and other objects in view, the invention consists in certain novel features of construction as hereinafter shown and described, and then particularly pointed out in the claims and in the drawings illustrative of the preferred embodiment of the invention.

In the accompanying drawings:—Figure 1 is a top plan view of the feeder with parts broken away and parts in section. Fig. 2 is a side elevation of the same, with parts broken away and parts in section. Fig. 3 is a transverse sectional view of the feeder cut on the line 3—3 of Fig. 1. Fig. 4 is a perspective view of an end portion of the feeder with parts separated. Fig. 5 is a longitudinal sectional view of a portion of the feeder cut on the line 5—5 of Fig. 1. Fig. 6 is a transverse sectional view of the feeder cut on the line 6—6 of Fig. 1. Fig. 7 is a similar view cut on the line 7—7 of Fig. 1. Fig. 8 is a similar view cut on the line 8—8 of Fig. 1. Fig. 9 is a similar view cut on the line 9—9 of Fig. 1. Fig. 10 is a similar view cut on the line 10—10 of Fig. 1. Fig. 11 is a similar view cut on the line 11—11 of Fig. 1.

Corresponding and like parts are referred to in the following description and indicated in all the views of the accompanying drawings by the same reference characters.

The feeder comprises parallel spaced bars 1, which are provided at their inner sides with channels 2. Strips 3 are secured to the opposite sides of the bars 1, and are connected together by cross bars 4 whereby the bars 1 are held in parallel and spaced relation. The strips 3 are provided at their inner sides with grooves 5. Blocks 6 are located between the strips 3 and are provided with slots 7. The said blocks are provided at their edges with ribs 8 which are slidably received in the grooves 5 of the strips 3. A pin 9 is fixed at one end of each block 6, and the said pins pass slidably and transversely through the adjacent cross bars 4. Springs 10 are interposed between the cross bars 4 and the blocks 6 and are under tension with a tendency to normally hold the said blocks 6 away from the said cross bars 4. Grippers 11 are pivoted to the slots 7 of the blocks 6 and are arranged in pairs, one pair being located adjacent one end of the feeder, and the other pair adjacent the opposite end thereof. The members of the pairs of grippers are located opposite each other transversely of the feeder. The inner end portions of the grippers 11 are curved toward the delivery end of the feeder as at 12. The outer end of the grippers 11 at the same side of the feeder are connected together by rods 13, and these rods are made up of sections which are connected together by means of turn buckles 14, whereby the rod 13 may be lengthened or shortened as desired. Members 15 are movably mounted in the channels 2 of the bars 1 and the said members 15 are provided at their inner sides with longitudinally disposed grooves 16. These grooves 16 receive the edge portions of the plate from which the blanks are to be cut. Pins 17 are fixed at their inner ends to the members 15 and pass transversely through the bars 1 and also slidably pass through the intermediate portions of yokes 18 attached to the outer sides of the said bars 1.

Nuts 19 are screw threaded upon the outer end portions of the pin 17 and are adapted to bear at their inner faces against the outer surfaces of the intermediate portion of the yokes 18 whereby the longitudinal movement of the said pins 17 is limited. Springs 20 are interposed between the intermediate portions of the yoke 18 and the members 15, and are under tension with a tendency to hold the members 15 toward each other. The movement of the members 15 toward each other is limited by the nuts 19. Inasmuch as the grooves 16 in the members 15 receive the edge portions of the plate and in view of the fact that the said members 15 are moved toward each other under spring tension the said members 15 slightly bind against the edge portions of the plate. In the drawing the plate is indicated at 21. This plate also passes between the curved end portions 12 of the members of the sets of grippers 11, and is frictionally engaged thereby. A sleeve 22 is mounted upon the intermediate portion of the bars 1 and a block 23 is slidably mounted upon the said sleeve. The block 23 is restrained against rotation with relation to the sleeve and the sleeve is restrained against rotation with relation to the bars 1. The block 23 is provided with a peripheral groove 24 which receives a ring 25, and the said block may rotate in the said ring. One end of a rod 26 is pivotally connected with the ring 25, and the other end of the said rod may be operatively connected in any suitable manner with a cam mechanism indicated at 27, whereby the said rod is reciprocated as the said cam mechanism rotates. Any other suitable means may be provided or improvised for reciprocating the rod 26. Set screws 28 pass transversely through the outer portions of the block 23 and at their inner ends engage the rods 13 which pass longitudinally through the block 23. Thus means is provided for fixing the rods 13 with relation to the block 23, and as the said block is reciprocated along the sleeve 22, the rods 13 are moved longitudinally whereby the grippers 11 are swung upon their pivots, when the block 23 is moved in a direction away from the extremities of the curved ends 12 of the grippers 11 as shown in Fig. 5, the said grippers will move along the plate 21 inasmuch as the said plate is retained by the members 15 hereinbefore described. When however, the block 23 is moved in an opposite direction, the grippers 11 are turned upon their pivots whereby their curved end portions 12 positively engage the opposite sides of the plate 21 and thus the plate 21 is moved simultaneously with the block 23. As the plate 21 is fed as last above indicated, the blocks 6 are also moved against the tension of the springs 10, but as soon as the movement of the block 23 as shown in Fig. 5, in the direction of the disposition of the curved end portions 12 of the gripper ceases, the tension of the springs 10 comes into play and blocks 6 are moved back and the grippers 11 are swung to the positions as indicated by the dotted lines in said Fig. 5. Thus the grippers 11 positively advance the plate 21 by steps through the feeder and during the intervals that the said grippers 11 are not positively engaging the plate 21, the said plate is restrained against retracted movement by the frictional contact of the members 15 therewith. A pulley 29 is mounted upon the bars 1, and a belt (not shown) is trained around the said pulley and operated to turn the pulley 29 one-half of a revolution first in one direction and then in an opposite direction. A collar 30 is mounted upon the bars 1 and is provided with flat sides 31. These sides may be received in a suitable bearing (not shown) whereby the feeder is restrained against longitudinal movement as it is partially rotated. A collar 32 is fixed to the bars 1 and may be received in a suitable bearing (not shown) whereby the delivery end portion of the feeder is supported. A funnel 33 is mounted at the receiving ends of the bars 1 and is adapted to direct the plate 21 between the members 15 when the plate is introduced into the feeder.

The nosepiece or mechanism of the feeder will now be described. The said mechanism includes arms 34 which are fixed to the delivery portions of the bars 1 at the outer sides thereof and which are provided with ends which converge toward each other as shown in Fig. 4. These arms 34 are provided at the inner sides of their end portions with grooves 35. Fingers 36 are secured to the delivery end portions of the members 15, and the outer or intermediate portions of the said fingers are received in the grooves 35 of the arms 34. The fingers 36 are provided at their inner sides with grooves 37 which slidably receive the edge portions of the plate 21. Resilient plates 38 are located at the opposite sides of the delivery end portion of the members 15 and have free end portions which bear against the opposite sides of the plate 21. The plates 38 are further provided with transversely disposed slots 39 which receive bolts 40 which in turn are attached to the members 15 as clearly shown in Fig. 3. Thus the said members 15 may move toward and away from each other and at the same time the plates 38 are held in proper positions upon the said members. The nosepiece or mechanism will hold the butt end of a plate in position for cutting the blank from the same after the end of the plate has passed beyond the terminal 6 of grippers 11 and is being forced toward the delivery end of the nosepiece or mechanism by the next plate which is inserted in the feeder. Therefore it will be seen that a feeder of simple structure is provided and that the parts are so assembled and arranged as to effectually brace each other and at the same time the butt end of a plate will be effectually held in position as blanks are being cut from the same.

Having described the invention what is claimed, is:—

1. A feeder comprising a body adapted to receive a plate therethrough, spaced horizontally reciprocatory members mounted upon the body and engaging the opposite edges of the plate, springs to force the members inwardly toward the plate, and means to feed the plate in one direction.

2. A feeder comprising a body adapted to receive a plate therethrough, spaced horizontally reciprocatory members mounted upon the body to move transversely thereof and provided with grooves to receive the edges of the plate to serve as brake and guide means therefor, springs to move the members inwardly toward the plate, and means to feed the plate in one direction.

3. A feeder comprising a body adapted to receive a plate, grippers pivotally connected with the body and adapted to engage the plate, longitudinally extensible rods connecting the grippers to bodily swing them into and out of engagement with the plate, means for reciprocating the rods and means for holding the plate against retractive movement.

4. A feeder comprising a body provided with means whereby a plate may be moved longitudinally thereof, a reciprocatory member mounted upon the body, a gripping finger pivoted to the reciprocatory member, and positively operated means to move the gripping finger into and out of engagement with the plate.

5. A feeder comprising channeled bars, spring pressed members movably mounted in the channels of the bars and provided at their inner sides with grooves, grippers pivotally mounted upon the body, means for swinging the grippers and moving the same longitudinally, and spring means for returning the grippers.

6. A feeder comprising a body adapted to receive a plate, spring pressed blocks slidably mounted upon the body, grippers pivotally mounted in the blocks and adapted to engage the plate, means for turning the grippers and moving the same to advance the plate through the body, and means for holding the plate against retractive movement.

7. A feeder comprising a body adapted to receive a plate, means for advancing the plate through the body, grooved arms attached to the delivery end of the body, grooved fingers attached to the body and located in the grooves of the arms, said fingers being provided with grooves adapted to receive the edge portions of the plate, and means for holding the plate against retractive movement.

8. A feeder comprising a body adapted to receive a plate, means for advancing the plate through the body, means for holding the plate against retractive movement, and resilient plates located at the delivery end of the body and adapted to bear against the opposite side of the first mentioned plate.

9. A feeder comprising a body adapted to receive a plate, means for advancing the plate intermittently through the body, means for holding the plate against retractive movement, arms fixed to the body at the delivery end thereof and provided with grooves, fingers carried at the delivery end of the body and located in the groove of the arms, said finger being provided with grooves adapted to receive the edge portions of the plate and resilient plates mounted upon the body and adapted to bear at their free end portions against the opposite sides of the first mentioned plate.

10. A feeder comprising a body adapted to receive a plate therethrough, a member longitudinally movably mounted upon the body, a gripping finger to engage the plate to move the same in one direction and movably mounted upon the member, and means movable with relation to the member and connected with the gripping finger to move the same into and out of engagement with the plate and to move the member through the medium of the finger.

11. A feeder comprising a body adapted to receive a plate therethrough, a member longitudinally movably mounted upon the body, a gripping finger pivoted to the member to engage the plate for feeding the same in one direction and operating means pivotally connected with the feeding gripping finger to bodily move the member through the medium of the said finger.

12. A feeder comprising a body adapted to receive a plate therethrough, a member longitudinally movably mounted upon the body, gripping fingers pivoted upon the member and arranged to engage the plate upon opposite sides thereof for feeding the same in one direction, reciprocatory rods connected with the gripping fingers, and means to move the rods.

13. A feeder comprising a body adapted to receive a plate therethrough, a member slidably mounted upon the body, gripping fingers pivoted upon the member to engage the plate, rods connected with the fingers, means to reciprocate the rods, and means to prevent improper movement of the plate in one direction.

14. A feeder comprising a body adapted to receive a plate therethrough, a member slidably mounted upon the body, gripping fingers pivoted upon the member to engage the plate, a second member slidably mounted upon the body, extensible connecting means between the fingers and second member, and means to reciprocate the second member.

15. A feeder comprising a body provided with means whereby a plate may be moved longitudinally thereof, gripping fingers pivoted upon the body and arranged upon opposite sides of the plate, and positively operated means to move the fingers into and out of engagement with the plate.

In testimony whereof I affix my signature in presence of two witnesses.

ALFRED T. KEITH.

Witnesses:
ARTHUR H. WILLIS,
JOSEPH W. KEITH.

---

Copies of this patent may be obtained for five cents each, by addressing the "Commissioner of Patents, Washington, D. C."